United States Patent
Unsal et al.

(10) Patent No.: US 10,054,607 B2
(45) Date of Patent: Aug. 21, 2018

(54) USING ACCELEROMETER TO SELF-TEST PIEZOELECTRIC COMPONENT IN A PORTABLE DEVICE

(71) Applicant: Google Inc., Mountain View, CA (US)

(72) Inventors: Martin Unsal, Mountain View, CA (US); Kenneth Louis Herman, San Jose, CA (US); Shao-Po Ma, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 116 days.

(21) Appl. No.: 15/153,207

(22) Filed: May 12, 2016

(65) Prior Publication Data
US 2017/0328930 A1 Nov. 16, 2017

(51) Int. Cl.
*G01P 1/02* (2006.01)
*G01P 13/00* (2006.01)

(52) U.S. Cl.
CPC ............. *G01P 13/00* (2013.01); *G01P 1/02* (2013.01)

(58) Field of Classification Search
CPC ................................. G01P 1/02; G01P 13/00
USPC .......................................................... 73/584
See application file for complete search history.

(56) References Cited

U.S. PATENT DOCUMENTS

| | | | |
|---|---|---|---|
| 5,438,859 A * | 8/1995 | Yamashita | G01P 1/006 73/1.38 |
| 5,447,051 A * | 9/1995 | Hanks | G01P 15/0922 73/1.15 |
| 5,753,793 A * | 5/1998 | Lindahl | G01P 21/00 73/1.15 |
| 6,205,872 B1 * | 3/2001 | Pflueg | G01H 11/08 73/593 |
| 6,708,420 B1 | 3/2004 | Flanagan et al. | |
| 6,792,806 B2 | 9/2004 | Ishikawa et al. | |
| 7,113,091 B2 | 9/2006 | Script et al. | |
| 8,217,790 B2 * | 7/2012 | Script | G01P 15/09 200/61.45 M |
| 2009/0040061 A1 | 2/2009 | Golunski et al. | |
| 2010/0037693 A1 | 2/2010 | Matsuo et al. | |
| 2014/0060209 A1 * | 3/2014 | Broillet | G01H 11/08 73/862.68 |

* cited by examiner

Primary Examiner — J M Saint Surin
(74) Attorney, Agent, or Firm — Morris & Kamlay LLP (57) ABSTRACT

A portable device such as a key fob includes a piezoelectric component, such as a vibrator or buzzer, and an accelerometer. Self-testing of the piezoelectric component in the portable device may be achieved by applying a test electrical signal to the piezoelectric component and determining whether a vibration is detected by the accelerometer. If a vibration is detected by the accelerometer, then a determination is made as to whether the vibration detected by the accelerometer matches the test electric signal applied to the piezoelectric component.

25 Claims, 4 Drawing Sheets

USING ACCELEROMETER TO SELF-TEST PIEZOELECTRIC COMPONENT IN A PORTABLE DEVICE

BACKGROUND

A piezoelectric material is a material that may generate an electric field or charge when it is subjected to a mechanical stress, and in reverse, may exhibit mechanical stress or deformity when it is subjected to an external electric field. Examples of piezoelectric materials include ceramics and crystals such as quartz, gallium phosphate or tourmaline.

BRIEF SUMMARY

According to an embodiment of the disclosed subject matter, a portable device includes a piezoelectric component configured to generate a mechanical movement in response to an electric signal; an accelerometer configured to detect an acceleration of the portable device; and a processor, communicably coupled to the piezoelectric component and the accelerometer, configured to apply a test electric signal to the piezoelectric component; determine whether a vibration is detected by the accelerometer in response to the test electric signal applied to the piezoelectric component; and based on a determination that the vibration is not detected by the accelerometer, transmit a notification that the piezoelectric component is inoperative.

According to an embodiment of the disclosed subject matter, a method of testing a piezoelectric component by an accelerometer in a portable device is provided. The method includes applying a test electric signal to the piezoelectric component; determining whether a vibration is detected by the accelerometer in response to the test electric signal applied to the piezoelectric component; and based on a determination that the vibration is not detected by the accelerometer, transmitting a notification that the piezoelectric component is inoperative.

According to an embodiment of the disclosed subject matter, an apparatus for testing a piezoelectric component by an accelerometer in a portable device is provided. The apparatus includes a memory; and a processor in communication with the memory, the processor configured to execute instructions to apply a test electric signal to the piezoelectric component; determine whether a vibration is detected by the accelerometer in response to the test electric signal applied to the piezoelectric component; and based on a determination that the vibration is not detected by the accelerometer, transmit a notification that the piezoelectric component is inoperative.

According to an embodiment of the disclosed subject matter, means for testing a piezoelectric component by an accelerometer in a portable device are provided, which include means for applying a test electric signal to the piezoelectric component; means for determining whether a vibration is detected by the accelerometer in response to the test electric signal applied to the piezoelectric component; and based on a determination that the vibration is not detected by the accelerometer, means for transmitting a notification that the piezoelectric component is inoperative.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Piezoelectric components have been implemented as vibrators or buzzers due to their ability to convert electric signals into mechanical vibrations. In consumer applications, it is desirable that inexpensive piezoelectric materials be used as vibrators or buzzers. However, a piezoelectric buzzer in a portable device, such as a key fob, sometimes may not function properly, that is, it may not generate mechanical vibrations even when an electric signal is applied to the buzzer. There has been no reliable method of detecting whether a piezoelectric buzzer is functional in a small portable device such as a key fob. A user may easily drop, lose, or misplace a key fob without realizing that it is dropped, lost, or misplaced due to the small size and light weight of the key fob. A piezoelectric component may be implemented as a vibrator or buzzer in the key fob to alert the user of the presence of the key fob. For example, the piezoelectric component in the key fob may generate a vibration when or after the key fob falls to the ground or a hard surface to alert the user of the fall. In some implementations, the piezoelectric component may generate a vibration periodically, for example, once every hour or once every few hours, to alert the user of the location of the key fob. If the piezoelectric component in a key fob stops working, then the user may not be able to find the key fob by listening to or feeling the vibration.

Figure 1:
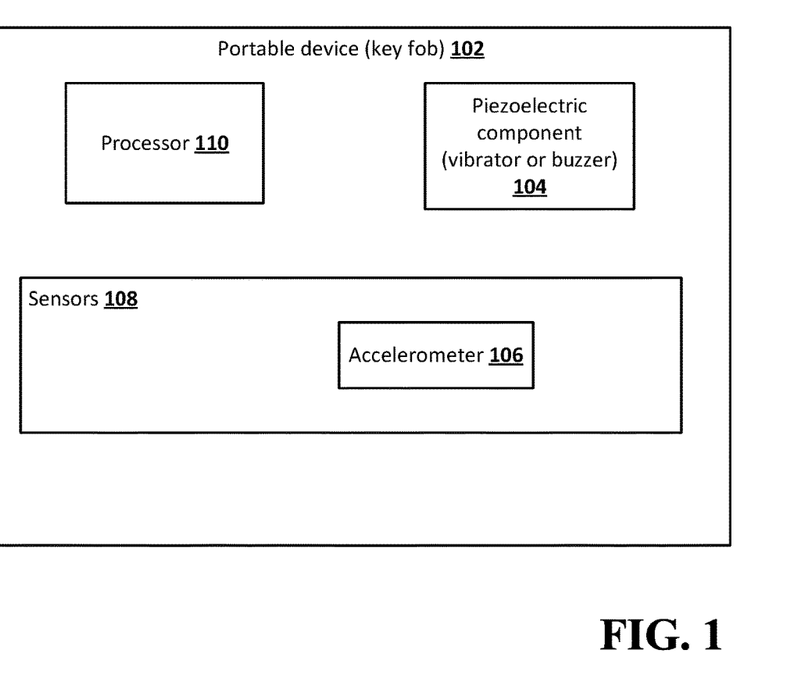
FIG. 1 shows an example of a portable device according to embodiments of the disclosed subject matter.

According to embodiments of the disclosed subject matter, an accelerometer is provided in the portable device to detect whether the piezoelectric component is functioning properly or not. FIG. 1 shows an example of a portable device 102, which includes a piezoelectric component 104, such as a vibrator or buzzer, and an accelerometer 106. Some portable devices such as key fobs may include one or more sensors in addition to the accelerometer 106. In the example shown in FIG. 1, the accelerometer 106 may be one of multiple types of sensors 108 in the portable device 102. In some implementations, a processor 110 also may be included in the portable device. The processor 110 may be a microprocessor or central processing unit (CPU), a microcontroller, or some other type of digital circuit. The accelerometer 106 may be deployed as a sensor in the portable device 102 for various purposes, such as detecting sudden movements by the portable device. In some implementations, the accelerometer 106 may be used for detecting a sudden acceleration when the portable device falls to the ground, for example. The acceleration detected by the accelerometer when the key fob is falling to the ground is expected to be linear and non-periodic. When the user carrying the key fob is walking, running, driving or riding in a vehicle, for example, the accelerometer in the key fob may detect linear or near-linear accelerations. Even if the user accelerates periodically while walking or running, the frequencies of such periodic accelerations are expected to be much lower than the frequencies of buzzer vibrations of about several hundred hertz to several kilohertz generated by the piezoelectric component. As used herein, "accelerations" include positive accelerations and decelerations, which are negative accelerations.

Figure 2:
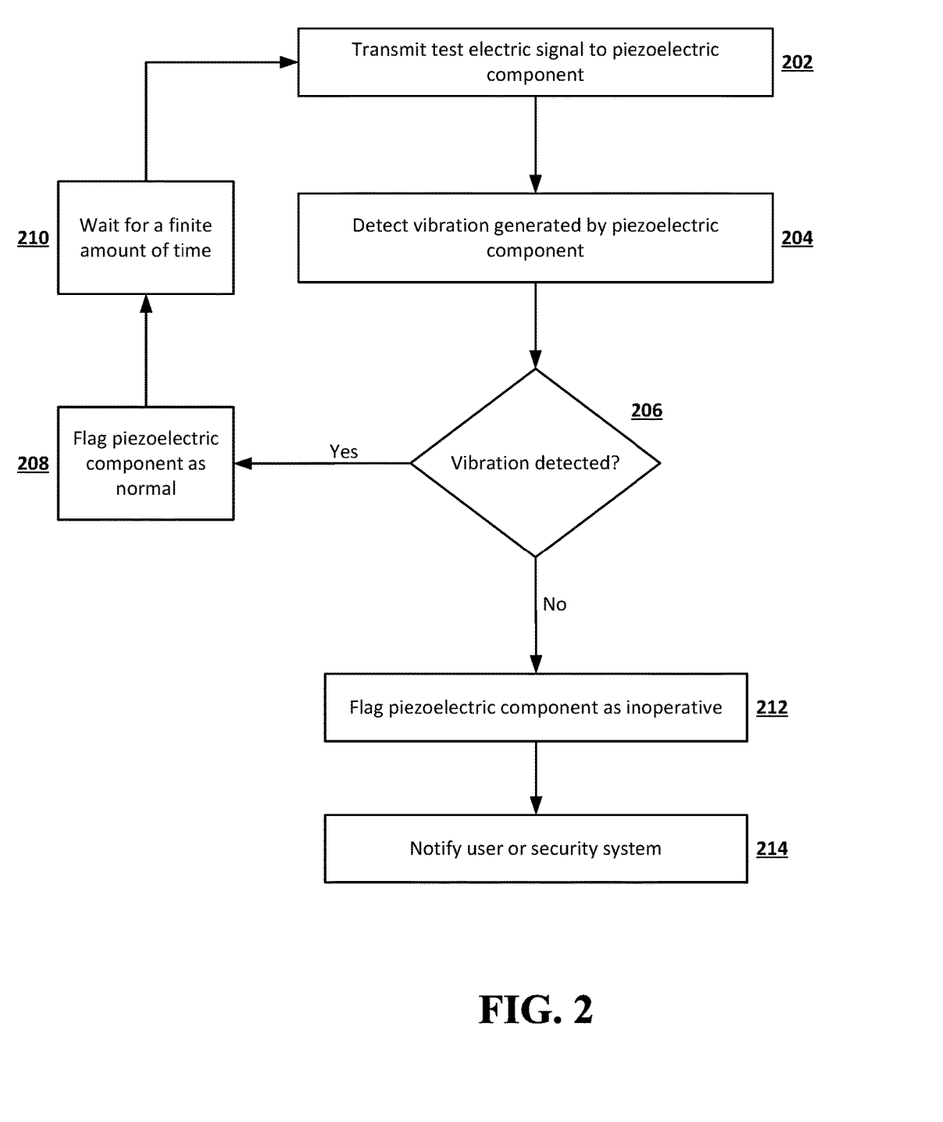
FIG. 2 shows an example of a process of self-testing a piezoelectric component in a portable device according to embodiments of the disclosed subject matter.

FIG. 2 shows an example of a process of detecting whether the piezoelectric component is functioning properly in a portable device by using the accelerometer in the same portable device. In some implementations, the processor in the portable device may determine whether the piezoelectric vibrator or buzzer has been inactive for a substantial amount of time. In some situations, it may be normal for a vibrator or buzzer in a portable device not to vibrate or to buzz for hours or days, or even longer. The processor may initiate testing of the piezoelectric component periodically, for example, once every few hours, once per day, once every week, once every month, or the like. In some implementations, instead of fixed time intervals, the processor may initiate testing of the piezoelectric component in random time intervals, for example. In some implementations, the processor may decide to test the piezoelectric component after a period of inactivity by the piezoelectric component, for example, after a few hours, a day, a few days, a week, or a month of inactivity.

In the example shown in FIG. 2, the processor may initiate the testing of the piezoelectric component by transmitting a test electric signal to the piezoelectric component in block 202. The electric signal may be a periodic sinusoidal signal or a pulsed signal, for example. In some instances, the electric signal may be modulated, for example, amplitude-modulated or frequency-modulated, to cause the piezoelectric vibrator or buzzer to vibrate or to buzz in a desired vibratory or buzzing sound pattern.

After the processor has initiated the testing of the piezoelectric component by transmitting a test electric signal to the piezoelectric component in block 202, the accelerometer, which is installed in the same portable device as the piezoelectric component, may attempt to detect a vibration generated by the piezoelectric device in block 204. If the piezoelectric component is functioning normally, then it will vibrate or buzz in response to the applied electric signal. The accelerometer may detect accelerations caused by the vibration, and generate a response to the processor upon detecting the accelerations. If the test electric signal applied to the piezoelectric component is in the form of sinusoids or periodic pulses, for example, the accelerations detected by the accelerometer may also be periodic over the time domain, matching the sinusoids or periodic pulses of the test electric signal. In contrast, accelerations detected by the accelerometer due to movements by the user carrying the key fob or dropping of the key fob due to gravity are not expected to have the characteristics of the vibration generated by the piezoelectric component in response to the test electric signal. Thus, the processor may distinguish the vibration generated by the piezoelectric component and detected by the accelerometer from accelerations detected by the accelerometer due to other movements of the key fob.

The processor, which may be communicably coupled to the piezoelectric component and the accelerometer, may determine whether the vibration detected by the accelerometer is due to the test electric signal applied to the piezoelectric component in block 206. In some instances, a portable device such as a key fob may be carried by a person who is walking or running, for example, and the accelerometer may detect accelerations due to forces other than those generated by the piezoelectric component. In some implementations, the processor may determine whether the characteristics of periodic accelerations detected by the accelerometer match those of the test electric signal applied to the piezoelectric component. For example, the processor may determine whether the frequency or modulation characteristics of the test electric signal applied to the piezoelectric component match those detected by the accelerometer. If the frequency or modulation characteristics of the test electric signal match the frequency or modulation characteristics of the vibration detected by the accelerometer, then the piezoelectric component may be deemed operative. On the other hand, if a match is not found, then the vibration detected by the accelerometer is not due to the vibration generated by the piezoelectric component, and the piezoelectric component may be deemed inoperative.

If the processor determines that the vibration detected by the accelerometer is generated by the piezoelectric component in response to the test electric signal in block 206, then the piezoelectric component may be flagged as normal, that is, in a functioning or operative state, in block 208. In some implementations, the processor may wait for a finite amount of time in block 210 before transmitting another test electric signal to test the piezoelectric component again in block 202. The piezoelectric component may be tested periodically over fixed time intervals, over random time intervals, or after a period of inactivity by the piezoelectric component. The amount of wait time in block 210 may depend on how often the piezoelectric component in the portable device is to be self-tested. The processor may be programmed to initiate self-testing of the piezoelectric component once every few hours, once a day, once every few days, once a week, once a month, or the like. Alternatively or in addition, the processor may be programmed to initiate self-testing of the piezoelectric component in random time intervals, or after a given time period of inactivity, for example, after a few hours, a day, a few days, a week, or a month of inactivity.

Figure 4:
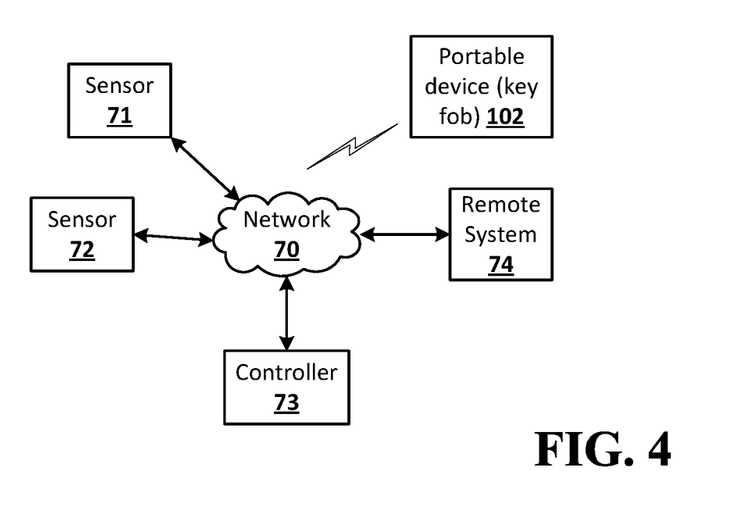
FIG. 4 shows an example of a sensor network according to embodiments of the disclosed subject matter.

If the processor determines that the accelerometer has not detected a vibration resulting from the test signal, then the piezoelectric component may be flagged as defective, that is, in a non-functioning or inoperative state, in block 212. If the processor has detected a vibration but has determined the detected vibration is not caused by the piezoelectric component because the frequency or modulation characteristics of the detected vibration do not match those of the electric signal applied to the piezoelectric component, then the piezoelectric component also may be flagged as defective, that is, in a non-functioning or inoperative state, in block 212. In some implementations, the processor may notify the user of the portable device or the security system that the piezoelectric component is inoperative or defective in block 214. For example, if the portable device such as a key fob is equipped with a light or display, the processor may warn the user of a malfunction in the piezoelectric component by generating a flashing light or a warning on the display. In some implementations, the portable device such as a smart key job may be part of an integrated security system, an example of which is shown in FIG. 4 and described below. In some implementations, the portable device or key fob may communicate wirelessly with other components of the security system, for example, a security controller, other sensors, and/or remote systems. In some implementations, upon determining that the piezoelectric component is inoperative or defective, the portable device or key fob may transmit a message to the security system, which may in turn notify the user through another device, such as a smartphone, a smartwatch or another mobile device, to allow the user to repair or to replace the portable device or key fob.

In some implementations, a "fob" as disclosed herein may be a limited-purpose device, such as a device that includes minimal hardware in contrast to other portable electronic devices such as smartphones, tablets, and the like. For example, a fob may include only the hardware and components shown and described with respect to FIG. 1 or equivalents thereof, and/or may omit other components such as a screen, touchscreen, or the like. A limited-purpose device also may incorporate specific-purpose or limited-purpose processors and/or other components, in contrast to general-purpose processors commonly used in smartphones and other similar portable electronic devices.

In some implementations, the key fob described herein may be a stand-alone key fob. In addition or as an alternative, the key fob may be part of a smart home system which may monitor the presence of various objects including the key fob in a home environment. For example, when the accelerometer in the key fob fails to detect a vibration generated by the piezoelectric component in response to a test signal, a wireless transmitter in the key fob may transmit an alert signal to the smart home system, which may in turn alert the user through another device, for example, by sending an audio, visual or text to a mobile device carried by the user. Key fobs as disclosed herein may be used in a variety of contexts within a smart home system, such as to identify a particular user of the system, to provide access to various features of the system or areas of a premises, to access secured items or enclosures such as safes, to alert the user of an unsafe condition or a breach of security detected by the smart home system by generating a buzz, or the like. In some implementations, the smart home system may include various sensors that may detect the presence of portable devices such as key fobs in the home environment. For example, a key fob may include a small wireless emitter, such as an infrared, radio-frequency identification (RFID) or near-field communication (NFC) emitter, which may allow infrared, RFID or NFC sensors in the smart home system to detect the key fob in the home environment. In some implementations, the key fob itself may include one or more sensors and may transmit sensor data to the home security system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 3:
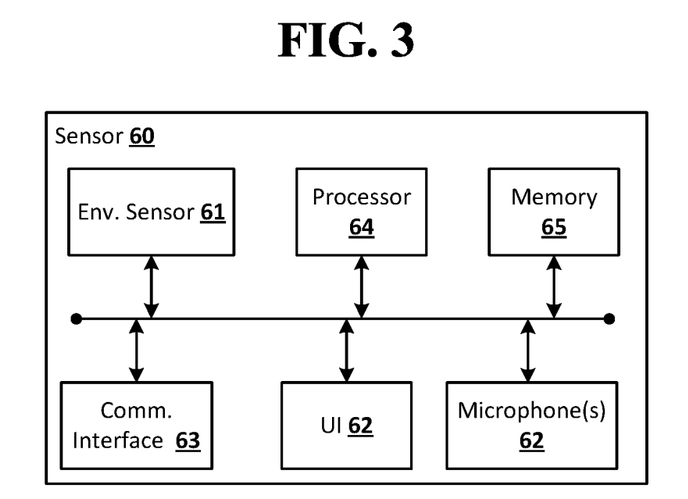
FIG. 3 shows an example of a sensor according to embodiments of the disclosed subject matter.

A sensor may include hardware in addition to the specific physical sensor that obtains information about the environment. FIG. 3 shows an example of a sensor as disclosed herein. The sensor 60 may include an environmental sensor 61, such as a temperature sensor, smoke sensor, carbon monoxide sensor, motion sensor, accelerometer, proximity sensor, infrared sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61 data. A communication interface 63, such as a Wi-Fi or other wireless interface, Ethernet or other local network interface, or the like, may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

In some configurations, two or more sensors may generate data that can be used by a processor of a system to generate a response and/or infer a state of the environment. For example, an ambient light sensor may determine that it is dark (e.g., less than 60 lux) in the room of a home in which it is located. A microphone may detect a sound above a set threshold, such as 60 dB, in the home. The processor may determine, based on the data generated by both sensors that it should activate all of the lights in the room. In the event the processor only received data from the ambient light sensor, it may not have any basis to alter the state of the lighting in the room. Similarly, if the processor only received data from the microphone, it may not make sense to activate the lights in the room because it is daytime or bright in the room (e.g., the lights are already on). As another example, two or more sensors may communicate with one another. Thus, data generated by multiple sensors simultaneously or nearly simultaneously may be used to determine a state of an environment and, based on the determined state, generate a response.

Data generated by one or more sensors may indicate patterns in the behavior of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there an abrupt increase in the amount of light is detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

FIG. 4 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 4 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space. One or more of the sensors 71, 72 may be located inside the structure to detect the presence of one or more occupants.

In some implementations, the smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include multiple rooms separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 4 may include multiple devices, including intelligent, multi-sensing, network-connected devices that may integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 4.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 4, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 4, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 4 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 4. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 4. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 4 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 4 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key fob, and the like). A webpage or application can be configured to receive communications from the user and control the one or more of the network-connected smart devices based on the communications and/or to present information about the device's operation to the user. For example, the user can view can arm or disarm the security system of the home.

As described above, a portable device such as a key fob 102 may be part of the security system as shown in FIG. 4. The portable device or key fob 102 may communicate wirelessly with the network 70, and may exchange information with one or more sensors 71, 72, the controller 73, and/or the remote system 74. One example of the portable device or key fob 102 includes a processor 110, a piezoelectric component 104, which may include a piezoelectric vibrator or buzzer, and one or more sensors 108, which may include an accelerometer 106, as shown in FIG. 1. In some implementations, self-testing of the piezoelectric component is performed by the accelerometer and the processor within the portable device or key fob, and a message notifying the security system of a fault on the part of the piezoelectric component may be transmitted to the security system upon detecting the fault. In some implementations, if the piezoelectric vibrator or buzzer in the portable device or key fob 102 is not working, one or more sensors 71 and 72 in the security system as shown in FIG. 4 may help the user locate the portable device or key fob in the environment being monitored by the sensors 71 and 72, for example.

One or more users can control one or more of the network-connected smart devices in the smart-home environment using a network-connected computer or portable electronic device. In some examples, some or all of the users (e.g., individuals who live in the home) can register their mobile device and/or key fobs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 5:
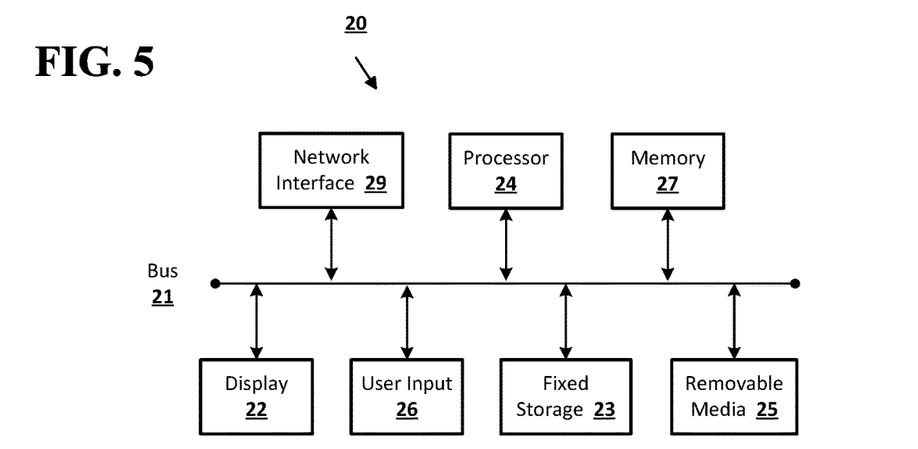
FIG. 5 shows an example of a computing device according to embodiments of the disclosed subject matter.

Embodiments of the presently disclosed subject matter may be implemented in and used with a variety of computing devices. FIG. 5 shows an example of a computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces.

The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A portable device comprising:
   a piezoelectric component configured to generate a mechanical movement in response to an electric signal;
   an accelerometer configured to detect an acceleration of the portable device; and
   a processor, communicably coupled to the piezoelectric component and the accelerometer, configured to:
      apply a test electric signal to the piezoelectric component;
      determine whether a vibration is detected by the accelerometer in response to the test electric signal applied to the piezoelectric component; and
      based on a determination that the vibration is not detected by the accelerometer, transmit a notification that the piezoelectric component is inoperative.

2. The portable device of claim 1, wherein the processor is further configured to:
distinguish the vibration in response to the test electric signal applied to the piezoelectric component from an acceleration due to a movement of the portable device other than the vibration.

3. The portable device of claim 1, wherein the processor is further configured to:
based on a determination that the vibration detected by the accelerometer is in response to the test electric signal applied to the piezoelectric component, flag the piezoelectric component as operative.

4. The portable device of claim 1, wherein the piezoelectric component comprises a vibrator.

5. The portable device of claim 1, wherein the piezoelectric component comprises a buzzer.

6. The portable device of claim 1, wherein the portable device comprises a key fob.

7. The portable device of claim 1, wherein the notification is transmitted as a warning signal on the portable device.

8. The portable device of claim 7, wherein the warning signal comprises a signal selected from the group consisting of a flashing light and a warning on a display of the portable device.

9. The portable device of claim 1, wherein the notification is transmitted to a security system.

10. A method of testing a piezoelectric component by an accelerometer in a portable device, the method comprising:
applying a test electric signal to the piezoelectric component;
determining whether a vibration is detected by the accelerometer in response to the test electric signal applied to the piezoelectric component; and
based on a determination that the vibration is not detected by the accelerometer, transmitting a notification that the piezoelectric component is inoperative.

11. The method of claim 10, further comprising:
distinguishing the vibration in response to the test electric signal applied to the piezoelectric component from an acceleration due to a movement of the portable device other than the vibration.

12. The method of claim 10, further comprising:
based on a determination that the vibration is in response to the test electric signal applied to the piezoelectric component, flagging the piezoelectric component as operative.

13. The method of claim 11, wherein determining whether the vibration is in response to the test electrical signal applied to the piezoelectric component comprises determining whether the vibration detected by the accelerometer matches the test electric signal applied to the piezoelectric component.

14. The method of claim 13, wherein determining whether the vibration detected by the accelerometer matches the test electric signal applied to the piezoelectric component comprises determining whether a frequency or modulation characteristic of the vibration detected by the accelerometer matches a frequency or modulation characteristic of the test electric signal applied to the piezoelectric component.

15. The method of claim 10, wherein the piezoelectric component comprises a vibrator.

16. The method of claim 10, wherein the piezoelectric component comprises a buzzer.

17. The method of claim 10, wherein the portable device comprises a key fob.

18. The method of claim 10, wherein transmitting the notification comprises transmitting the notification as a warning signal on the portable device.

19. The method of claim 18, wherein the warning signal comprises a signal selected from the group consisting of a flashing light and a warning on a display of the portable device.

20. The method of claim 10, wherein transmitting the notification comprises transmitting the notification to a security system.

21. An apparatus for testing a piezoelectric component by an accelerometer in a portable device, the apparatus comprising:
a memory; and
a processor in communication with the memory, the processor configured to execute instructions to:
apply a test electric signal to the piezoelectric component;
determine whether a vibration is detected by the accelerometer in response to the test electric signal applied to the piezoelectric component; and
based on a determination that the vibration is not detected by the accelerometer, transmit a notification that the piezoelectric component is inoperative.

22. The apparatus of claim 21, wherein the processor is further configured to execute instructions to:
distinguish the vibration in response to the test electric signal applied to the piezoelectric component from an acceleration due to a movement of the portable device other than the vibration.

23. The apparatus of claim 21, wherein the processor is further configured to execute instructions to:
based on a determination that the vibration is in response to the test electric signal applied to the piezoelectric component, flag the piezoelectric component as operative.

24. The apparatus of claim 21, wherein the piezoelectric component comprises a component selected from the group consisting of a vibrator and a buzzer.

25. The apparatus of claim 21, wherein the portable device comprises a key fob.

* * * * *